United States Patent [19]

Ballard

[11] Patent Number: 4,572,944
[45] Date of Patent: Feb. 25, 1986

[54] ADJUSTABLE WELDING FURNACE

[76] Inventor: Thomas B. Ballard, 25550 Mulberry, Southfield, Mich. 48034

[21] Appl. No.: 581,026

[22] Filed: Feb. 17, 1984

Related U.S. Application Data

[63] Continuation of Ser. No. 313,421, Oct. 21, 1981, Pat. No. 4,456,819.

[51] Int. Cl.$^4$ ............................................. F27D 11/00
[52] U.S. Cl. .................................... 219/391; 219/392; 219/386; 219/521; 126/24
[58] Field of Search ............... 219/391, 392, 521, 403, 219/385, 200, 218, 386, 389, 390, 85 E; 432/225, 230, 231; 16/364, 237, 242, 235; 126/24, 30, 41 R, 41 A, 41 B, 41 C, 19 M; 34/126, 201, 202

[56] References Cited

U.S. PATENT DOCUMENTS

| 16,349 | 1/1957 | Beardsley | 126/24 |
|---|---|---|---|
| 1,421,890 | 7/1922 | Baker | 126/24 |
| 2,475,499 | 7/1949 | Hearst | 126/24 |
| 2,520,412 | 8/1950 | Jensen | 126/24 |
| 2,693,176 | 11/1954 | Spiers | 126/24 |
| 2,798,930 | 7/1957 | Frost | 219/392 |
| 3,239,206 | 3/1966 | Puxkandl | 266/36 |
| 3,824,061 | 7/1974 | Giehler | 425/435 |

FOREIGN PATENT DOCUMENTS 231465  6/1944  Switzerland ........................ 219/392

Primary Examiner—C. L. Albritton
Assistant Examiner—Teresa J. Walberg
Attorney, Agent, or Firm—Krass and Young

[57] ABSTRACT

An adjustable welding furnace includes a gimbal-mounted furnace housing within which a workpiece may be preheated and subsequently welded. A removable cover is mounted over an access opening in the housing for pivotal movement along either of two edges of the opening. A rotatable spit assembly, which may be mounted in any of several positions on the housing, suspends the workpiece within the housing for rotation independent of pivotal movement of the housing. A drawer-mounted heating assembly may be easily removed from the housing for servicing.

9 Claims, 5 Drawing Figures

ADJUSTABLE WELDING FURNACE

This application is a continuation of application Ser No. 313,421, filed Oct. 21, 1981, now U.S. Pat. No. 4,456,819.

TECHNICAL FIELD

The present invention generally relates to industrial furnaces, and deals more particularly with a furnace for preheating a workpiece and in which welding operations may be performed.

BACKGROUND ART

Welding operations are routinely performed on various types of items, such as automobile engine blocks, in order to effect repairs. Due to the geometric configuration of these items and/or the particular alloys from which they are made, localized heating of certain portions of the workpiece may result in irreparable damage to the worpiece; for example, localized heating of an engine block may result in warpage or cracking of cylinder walls.

It is therefore often necessary to preheat the workpiece before the welding operations are performed. Heretofore, it was necessary to place the workpiece in an oven for the preheating operation following which the preheated workpiece was removed from the oven and the welding was performed. However, the duration for which welding could be continued was limited since the workpiece began cooling as soon as it was removed from the oven.

The task of designing a furnace within which welding operations might be performed is complicated by the fact that some workpieces are relatively heavy and access must be had to virtually all points on the workpiece through the furnace.

Accordingly, it is a primary object of the present invention to provide a welding furnace which preheats a workpiece to be welded and allows the workpiece to be welded wthin the furnace.

A further object of the invention is to provide a welding furnace of the type mentioned above which permits convenient access to virtually all locations on the workpiece.

A still further object of the invention is to provide a welding furnace similar to that described above which is readily portable and is adapted to accommodate a wide range of workpieces.

DISCLOSURE OF THE INVENTION

An adjustable welding furnace includes a furnace housing within which a workpiece may be preheated and subsequently welded. The housing is mounted on a base by means of a gimbal arrangement to allow simultaneous pivoting of the furnace about two perpendicular axes. The housing includes an access opening provided with a cover which may be pivoted along either of two edges of the opening. A rotatable spit assembly includes a pair of support members which are rotatably mounted in opposite sides of the housing and mount the workpiece within the housing for rotation independent of pivotal movement of the housing on the base. The support members may be mounted in any of several locations on the housing in order to position the workpiece at any of several distances from the housing opening. An assembly for heating the interior of the housing is drawer-mounted for easy removal therefrom.

BRIEF DESCRIPTION OF THE DRAWINGS

In the drawings, which form an integral part of the specification and are to be read in conjunction therewith, and in which like reference numerals are employed to designate identical parts in the various views.

BEST MODE FOR CARRYING OUT THE INVENTION

Figure 1:
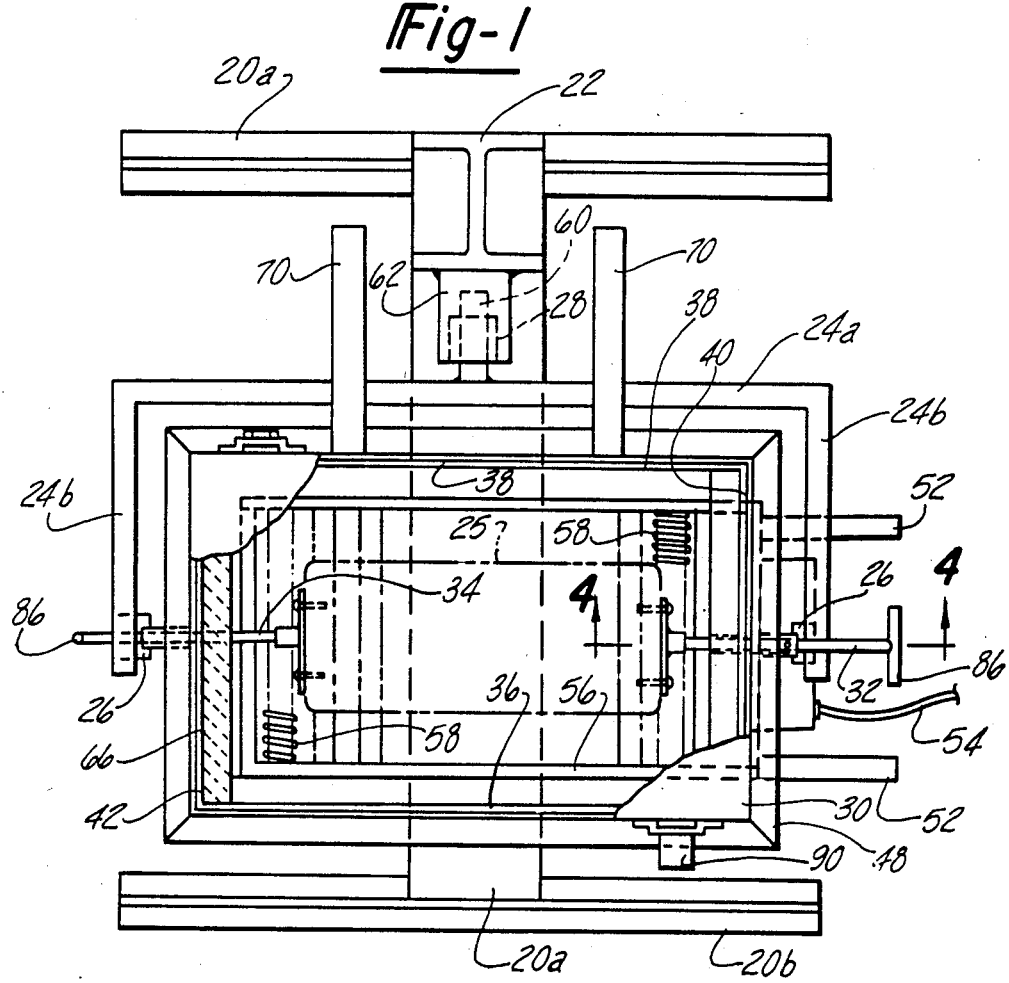
FIG. 1 is a plan view of the welding furnace which forms the preferred embodiment of the present invention, with the cover being broken away to reveal the interior of the housing, a workpiece being indicated in phantom.
Figure 2:
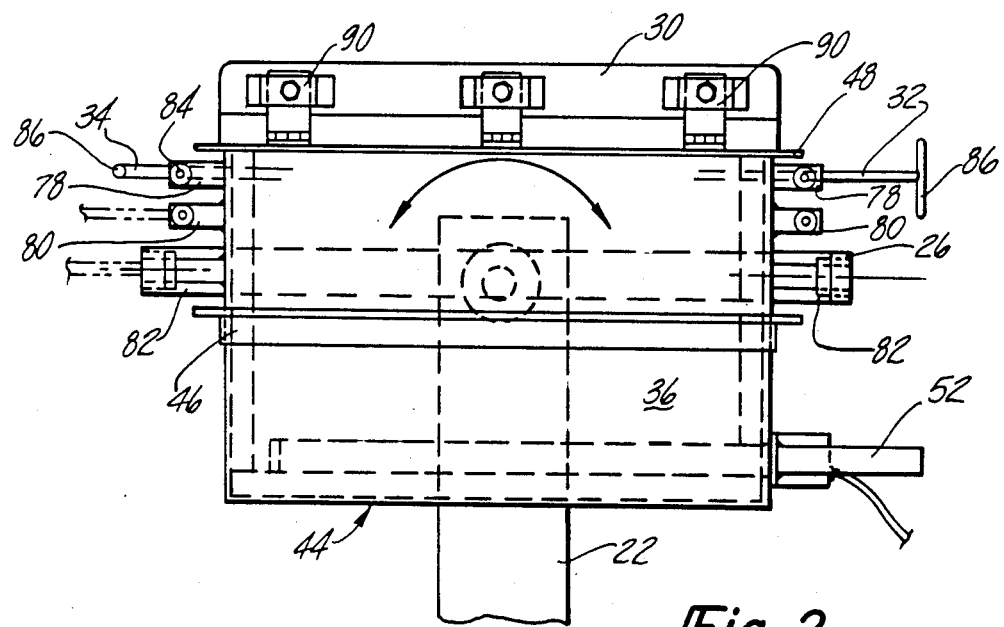
FIG. 2 is a fragmentary, front view of the upper portion of the welding furnace shown in FIG. 1.
Figure 3:
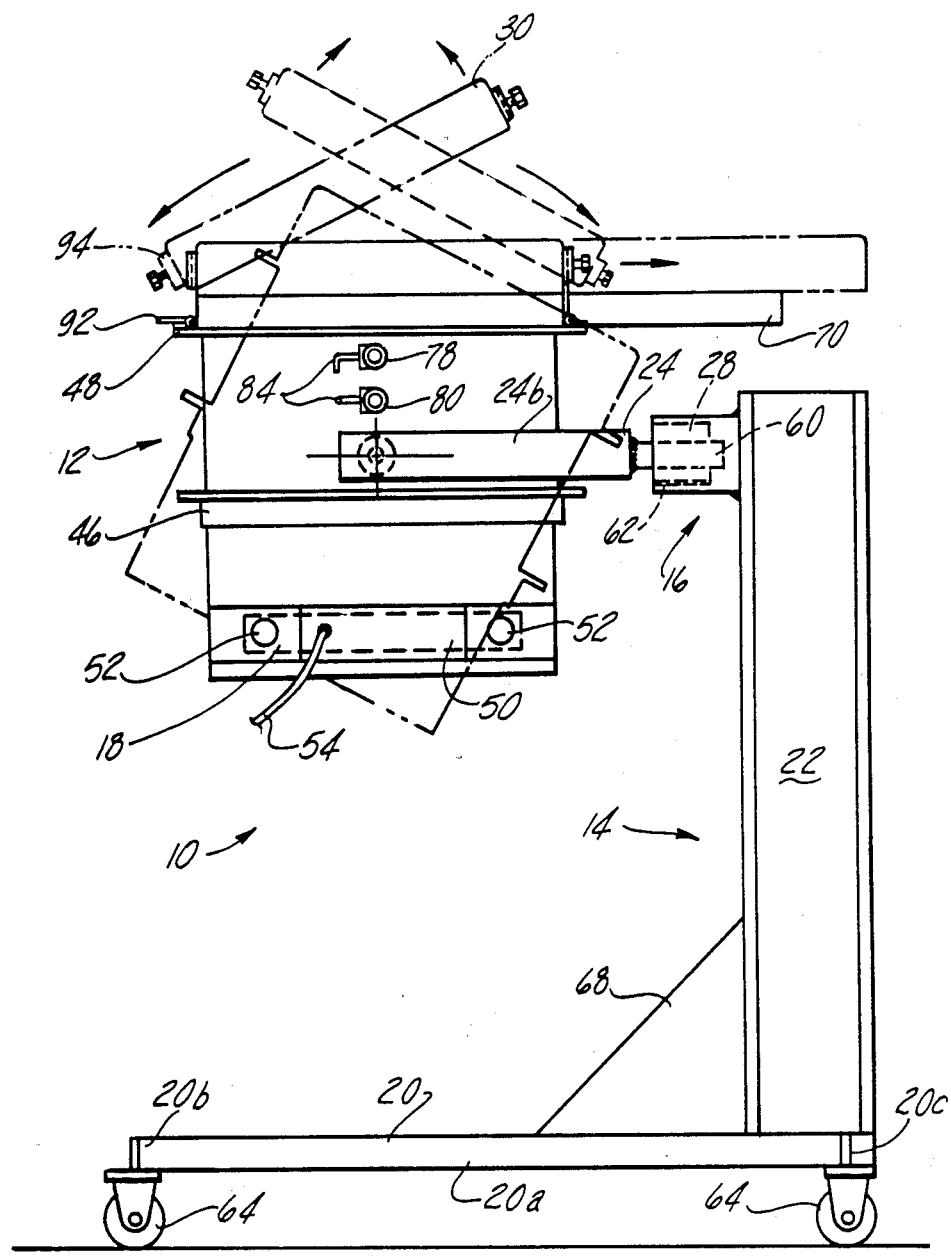
FIG. 3 is a side elevational view of the welding furnace shown in FIGS. 1 and 2, alternate positions of the cover being indicated in phantom.
Figure 4:
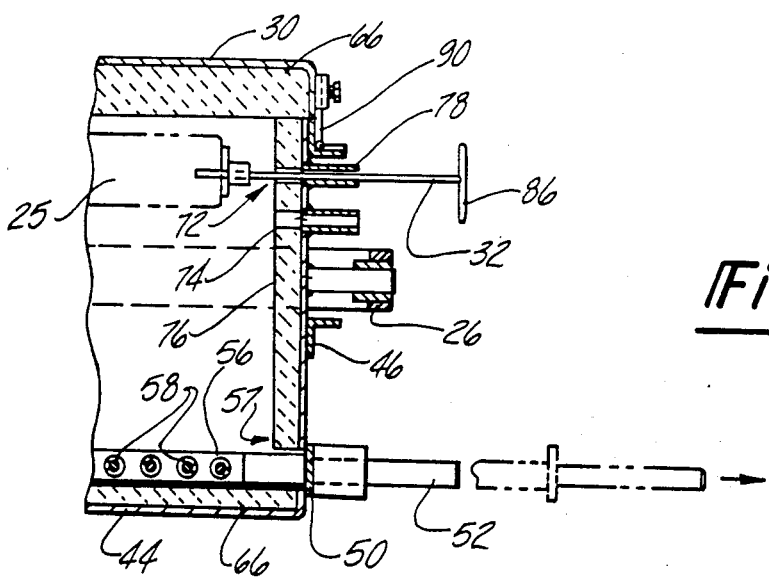
FIG. 4 is a cross-sectional view taken along the line 4—4 in FIG. 1.
Figure 5:
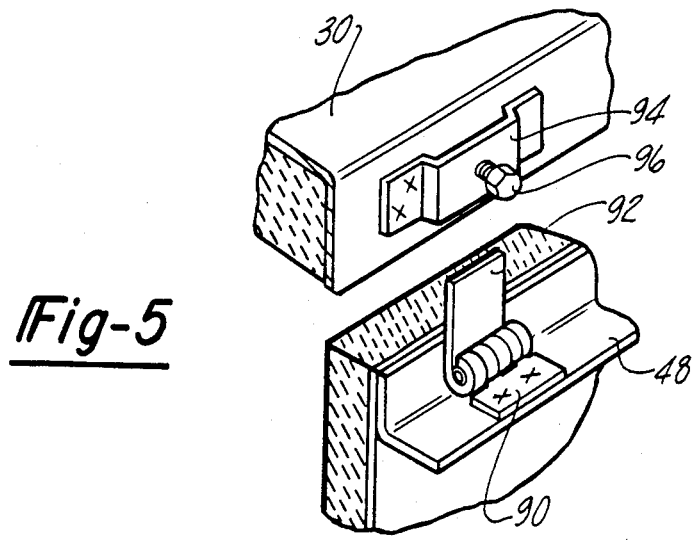
FIG. 5 is a fragmentary, perspective view, taken on a larger scale, of one of the hinges for pivotally mounting the cover on the housing.

With reference to the drawings, a welding furnace generally indicated by the numeral 10 broadly comprises housing means 12 mounted on a portable base 14 by means of pivotal mounting means 16.

The base 14 includes a horizontal support assembly comprising a longitudinal, horizontal support member 20 whose opposite extremities are secured, as by welding, to a pair of transversely extending support members 20b and 20c. The opposite extremities of support members 20b and 20c are provided with pivotally mounted wheel members 64 which render the furnace 10 readily portable for travel on a suitable support surface. The upright support member 22, which may be I-shaped in cross section, has the lower extremity thereof secured to one end of the horizontal support 20, as by welding. The entire base 14 is preferably constructed of relatively heavy steel or iron and may include a triangularly-shaped brace member 68 welded between the upright support 22 and the horizontal support 20 to provide added rigidity.

Pivotal mounting means 16 comprises a gimbal arrangement which includes a U-shaped support arm 24 consisting of a base 24a and legs 24b. The outer extremity of each leg 24b provides a pivotal support for the housing means 12. The base 24a of support arm 24 includes a rearwardly extending axle 60 which is pivotally received by a bearing 28 carried by a forward extension 62 which is secured, as by welding, to the upper extremity of the upright support 22. Thus, it may be appreciated that the support arm 24, and thus housing means 12, is pivotable about a longitudinal axis extending essentially parallel to the horizontal support 20, while the housing means 12 is also pivotal about a transversely extending axis between the legs 24b.

Housing means 12 is generally box-like in shape and is defined by spaced-apart front and rear walls 36 and 38, spaced-apart sidewalls 40 and 42, and a bottom wall 44 joined together, as by welding, along their mutual edges to form an enclosure having an open top. The enclosure may be laterally reinforced by means of peripheral reinforcement members 46 and 48, each of which may be L-shaped in cross section.

A rectangularly-shaped cover 30 overlies the opening of the top of the housing means 12, and is releasably secured thereto by hinge means 90. The cover 30 may be formed of relatively heavy metal, similar to the walls 36–44 of the housing means 12. A pair of spaced-apart cover supports 70 extend outwardly from sidewall 38 and function to support the cover 30 when removed from the housing means 12. The hinge means 90 include a plurality of spaced-apart hinge assemblies along the forward and rear edges of the cover 30. Each of the hinge means 90 includes a male tongue 92 hingedly secured to the reinforcement member 48 and a U-shaped, female portion 94 secured on the cover 30 and defining a slot for receiving the male tongue 92 therein. A screw member 96 passing through the female portion 94 may be screwed into engagement with the face of male tongue 92 in order to secure the male and female portions 92 and 94 in relationship to each other.

Essentially, the entire interior surface area of the housing means 12 is lined with a suitable insulating material, such as firebrick 66.

Means for shiftably supporting a workpiece 25 within the interior of the housing means 12 consists of a spit arrangement which broadly includes a pair of elongate, rod-shaped support members 32 and 34 which extend through sidewalls 40 and 42 toward each other. The outer extremities of each of the support members 32 and 34 are provided with any type of suitable handle 86 which permits manual rotation of the support members 32 and 34, and thus of the workpiece 25. Intermediate portions of the support members 32 and 34 are received through a series of openings 72, 74 and 76 in the sidewalls 40 and 42. Spaced-apart bearing surfaces for supporting the rod members 32 and 34 are defined by sleeves 78–82 mounted on the exterior side of the corresponding sidewalls 40 and 42, in alignment with the associated openings 72–76. Openings 76 and sleeves 82 are aligned coaxial with the transverse axis about which the housing means 12 rotates on support arm 24. Thus, it may be readily appreciated that the housing means 12 may be rotated relative to support arm 24 while the workpiece may be maintained in a constant attitude by rotation of one of the support members 32 and 34. Openings 74 and 72, as well as corresponding sleeves 80 and 78, are radially spaced at successively greater distances from the transverse axis about which the housing means 12 rotates and in a direction toward the upper opening in the housing means 12.

The inner extremities of each of the support members 32 and 34 have releasably secured thereto, as with set screws or the like, a pair of corresponding mounting brackets 88 which are specifically configured to be mounted on the workpiece 25 with screws or the like.

The heating means 18 comprises a modular drawer assembly insertable through a rectangularly-shaped opening adjacent the bottom of sidewall 40. The drawer assembly includes a rectangularly-shaped frame 56 upon which there is mounted a plurality of parallel heating elements 58. Heating elements 58 are interconnected by a conductor 54 to a suitable source of electric power (not shown). Heating elements 58 may be of the conventional resistive type such as those sold under the trademark of Calrod. The frame 56 is provided with a rectangular base plate 50 on one end thereof which is adapted to overlie the sidewall 40 surrounding the opening 57. A pair of spaced-apart handles 52 secured to the base plate 50 provide a means for grasping the heating means 18 in order to move and reinstall the same into the housing means 12.

INDUSTRIAL APPLICABILITY

The welding furnace of the present invention is well adapted for carrying out various types of metal working operations on metal workpieces which must be preheated to a prescribed temperature during the metal working operations. The welding furnace 10 is readily portable and may be wheeled to virtually any desired location where the metal working operation is to be performed. As previously mentioned, the brackets 88, which are specifically configured to be mounted on a particular workpiece, are secured to the inner extremity of the support members 32 and 34. The cover 30 is then removed and the workpiece is inserted into the interior of the housing means 12 and secured to the brackets 88. Cover 30 is then reinstalled over the opening of the housing means 12 and the heating means 18 is energized in order to preheat the workpiece 25.

In order to perform welding or other metal working operations within the housing means 12, the cover 30 is pivoted about the forward or rear edge of the opening in the housing means 12. Alternatively, the male and female portions 92 and 94 of the hinges 90 may be disconnected and the cover 30 may be either completely removed or slid rearwardly onto the supports 70.

The gimbal mounting of the housing means 12 on the base 14 allows the housing means 12 to be pivoted about longitudinal and transverse axes to virtually any position, so as to orient the opening as desired. As previously mentioned, the workpiece 25 may be rotated independently of the rotation of the housing means 12 by simply turning one of the support members 32 or 34. Set screws 84 may be employed to lock the support members 32 and 34 against rotation, if desired.

From the foregoing, it may be appreciated that the welding furnace described above not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the spirit and scope of the contribution to the art. Accordingly, it is to be understood that the protection sought and to be afforded hereby should be deemed to extend to the subject matter claimed and all equivalents thereof fairly within the scope of the invention.

What is claimed is:

1. A welding furnace comprising:
   a base;
   a furnace housing including substantially continuous walls defining a hollow substantially enclosed interior space for receipt of a workpiece to be welded and including an opening therein through which access may be gained to said workpiece within said housing interior;
   means for mounting said furnace housing on said base for pivotal movement about a first axis which extends through said housing walls and through said housing interior and about a second axis which extends through said housing walls and through said housing interior and is disposed substantially perpendicular to said first axis;
   means within said housing interior mounting said workpiece for movement within said housing interior relative to said housing;
   control means disposed outside of said housing for selectively manually moving said workpiece mounting means within said housing interior to selectively move said workpiece within said housing interior relative to said housing; and means within said housing interior for heating said housing interior and thereby said workpiece disposed within said housing interior.

2. The welding furnace of claim 1 wherein said housing is rectangular and includes a pair of spaced apart, generally parallel side walls and said housing mounting means includes a pair of pivot supports respectively connected substantially centrally on said side walls to mount said housing for swingable movement about said first axis at said pair of pivot supports.

3. The welding furnace of claim 1 wherein said housing mounting means includes a U-shaped mounting arm including a base portion and arm portions extending from said base portion, a pair of pivotal connections respectively on the free ends of said arm portions for pivotally mounting said housing on said arm for movement about said first axis, and a third pivotal connection intermediate the extremities of said base portion for pivotally mounting said arm on said base for movement about said second axis.

4. A welding comprising:

a base;

a generally rectangular housing having a hollow interior within which a workpiece to be welded may be contained, said housing including a front, rear, top, bottom and side walls, said housing further including an opening therein through which access may be gained to a workpiece within said housing interior;

gimbal mounting means for mounting said housing about first and second axes which extend perpendicular to each other, said mounting means including a pair of first pivots respectively connected generally centrally on said side walls whereby said first axis extends essentially centrally through said side walls and through said housing interior;

means within said housing interior mounting said workpiece for movement within said housing interior relative to said housing;

control means disposed outside of said housing for selectively manually moving said workpiece mounting means to selectively move said workpiece within said housing interior relative to said housing; and means within said housing interior for heating said housing interior and thereby said workpiece disposed therein.

5. The welding furnace of claim 4 wherein said housing mounting means further includes a second pivot and said second axis extends through said second pivot and essentially centrally through said front and rear walls and centrally through said housing interior.

6. The welding furnace of claim 4 wherein said workpiece mounting means supports said workpiece generally centrally within said housing.

7. The welding furnace of claim 6 wherein said workpiece mounting means includes means for rotating said workpiece within said housing independent of rotation of said housing about said first and second axes.

8. A welding furnace comprising:

a base;

means for housing a workpiece to be welded and including an opening therein through which access may be gained to said workpiece within the interior of said housing means, said housing means including a first portion and a second portion;

means for mounting said housing means on said base for pivotal movement about first and second axes which extend substantially perpendicular to each other, said first axis extending through said housing means and between said first and second portions of said housing means;

means for shiftably mounting a workpiece to be welded within said housing and including a rotatable shaft adapted to be coupled with said workpiece for rotating said workpiece with the longitudinal axis of said shaft disposed coaxial with said first axis; and means communicating with the interior of said housing means for heating the interior of said housing means.

9. A welding furnace comprising:

a base;

a generally rectangular housing having a hollow interior in which a workpiece to be welded may be contained, said housing including a front, rear, top, bottom and side walls, said housing further including an opening in said top wall through which access may be gained to a workpiece within said housing interior;

gimbal mounting means for mounting said housing about first and second axes which extend perpendicular to each other, said mounting means including a pair of first pivots respectively connected generally centrally on said side walls whereby said first axis extends essentially centrally through said housing; and means for shiftably mounting said workpiece within said housing and including means for supporting said workpiece generally centrally within said housing;

said supporting means including means for rotating said workpiece within said housing independent of rotation of said housing about said first and second axis;

said mounting means and said supporting means cooperating with said opening to allow access to virtually all locations on said workpiece from any of a plurality of areas outside said housing;

said furnace further including means communicating with the interior of said housing for heating the workpiece.

* * * * *